United States Patent [19]

Inbar et al.

[11] 4,432,059
[45] Feb. 14, 1984

[54] SCANNING GAMMA CAMERA

[75] Inventors: Dan Inbar; Tsur Bernstein, both of Haifa; Yair Shimoni, Jerusalem, all of Israel

[73] Assignee: Elscint Ltd., Haifa, Israel

[21] Appl. No.: 183,844

[22] Filed: Sep. 3, 1980

[51] Int. Cl.³ .............................................. G01T 1/20
[52] U.S. Cl. ................................ 364/414; 250/363 S; 364/571
[58] Field of Search ............... 364/414, 415, 515, 571; 250/363 R, 363 S; 382/1, 6, 42

[56] References Cited

U.S. PATENT DOCUMENTS

| | | | |
|---|---|---|---|
| 3,919,557 | 11/1975 | Berninger | 350/366 |
| 3,970,852 | 7/1976 | Richey et al. | 250/363 S |
| 3,979,592 | 9/1976 | Doherty et al. | 250/363 S |
| 3,993,908 | 11/1976 | Kaplan et al. | 250/363 S |
| 4,012,636 | 3/1977 | Engdahl et al. | 250/363 S |
| 4,020,348 | 4/1977 | Turcotte et al. | 250/363 S |
| 4,223,221 | 9/1980 | Gambini et al. | 250/363 S |
| 4,281,382 | 7/1981 | Knoll et al. | 364/571 |
| 4,298,944 | 11/1981 | Stoub et al. | 250/363 S |
| 4,316,257 | 2/1982 | Del Medico et al. | 364/571 |
| 4,323,977 | 4/1982 | Arseneau | 250/363 S |

Primary Examiner—Errol A. Krass
Attorney, Agent, or Firm—Sandler & Greenblum

[57] ABSTRACT

By reason of the nature of the scanning regimen followed by a scanning gamma camera head, and the shape of the active region of the head, not all of the elemental areas of a scanned radiation field are observed by the active region of the head for the same period of time. This non-uniformity sensitivity of the system is corrected by correction factors that are either analytically calculated or experimentally determined for each given elemental area of the map. The map of an unknown radiation source obtained by following the scanning regimen is corrected by applying the sensitivity correction factors to the contents of corresponding elemental areas of the map.

32 Claims, 6 Drawing Figures

DISTRIBUTION OF COUNTS ALONG LINE A-A OF THE RADIATION FIELD $$(S.C.F.)_j = \frac{\sum_{i=1}^{n} N_i}{n \cdot N_j} = \frac{\bar{N}}{N_j}$$

WHERE n = NO. OF ELEMENTAL AREAS ALONG LINE

SCANNING GAMMA CAMERA

DESCRIPTION

Technical Field

This invention relates to a scanning gamma camera.

Background Art

A scanning gamma camera is used, for example, to image patients with bone cancer in order to determine whether the disease has metastasized and spread to other organs. The field to be scanned in such cases is about 200×60 cm, and the scan is carried out with a conventional gamma camera coupled to a mechanical arrangement for establishing relative movement between the camera head and a scanning table carrying a patient. Such cameras usually have a crystal whose active area is circular with a diameter of about 40 cm. The scan of the larger radiation field is usually carried out in either a single or multiple pass mode of operation.

In the single pass mode of operation, a diverging collimator is used with the gamma camera. Such collimator is designed to give the camera head a field of view large enough to encompass the entire width of the body so that a single lengthwise pass can be made from one end of the body to the other along its centerline in order to obtain an image of the entire body. The advantage of this mode of operation lies in completing the scan in one pass, which minimizes equipment complexity and eliminates seams that result from multiple passes of the body. The disadvantage, however, of the single pass mode of operation lies in the so-called "fish-eye" distortion which results from using a diverging collimator. In addition, the system has limited sensitivity and, or course, a special collimator is needed.

In the usual multiple pass mode of operation, the camera head is positioned on one side of the centerline of the patient and is then moved longitudinally in one direction from one end of the patient to the other. Either the camera head or the scanning table is then moved transversely or laterally to the other side of the centerline. Then the head is moved back in the opposite direction back to the starting position. Thus, two passes are required to complete the scan of the patient. The multiple pass system has the advantages of eliminating fisheye distortion and the need for a special diverging collimator.

The multiple pass mode, however, requires a mechanical system for imparting relative movement between the head of the gamma camera and the scanning table. The conventional scanning regimen followed is such that each elemental area of a radiation field is scanned for essentially the same interval of time. An example of such a conventional regimen involves electronically modifying a window that defines the active area of the crystal during the scan. In such case, the head is located at one terminal position and the active region of the head is electronically limited to a narrow rectangle extending transversely to the direction of the scan. The head remains stationary for a predetermined period of time as the width of the window is continuously enlarged, electronically, in the direction of the scan to a predetermined maximum length after which the head begins to move and scan the radiation field at a uniform speed related to the speed at which the window is enlarged.

After the head has moved from one axial end of the scanning table to the other, head movement terminates and the width of the window is continuously contracted, electronically, inversely to the manner in which it was enlarged at the starting end of the scan. When this is complete, lateral relative movement of the head and scanning table occurs, and the process described above is repeated until the scan is complete.

This procedure of masking the active region of the head to provide a rectangular window is necessary in order to provide a uniformly sensitive system which is defined as a system in which each elemental area of an object being scanned is observed (i.e., scanned) by an active region of the crystal for the same period of time throughout the scan. In other words, the scanning regimen followed is such that each elemental area of the radiation field is scanned by the head for the same time interval, which is to say that the scanning time interval distribution over the field is uniform.

The windowing process described above achieves uniform sensitivity using a scintillation crystal having a round active region. If no windowing were provided, the scanning of the radiation field by a round active region would result in the elemental areas of the region swept by the periphery of the crystal being "seen" or scanned by the crystal for a shorter period of time than an elemental area positioned along the diameter of the crystal in the scanning direction. Because of this situation, the probability of interaction of stimuli emitted from these different areas will be different. In the absence of windowing, the true representation of the activity of a radiation field will be distorted by the non-uniform sensitivity of the system.

There is a distinct advantage in utilizing as large an active region of a gamma camera head as possible for imaging during whole body scans rather than reducing the active area by windowing. The greater the active regions of the gamma camera head, the more counts that can be accumulated or obtained per unit time. Thus, if it were possible to enlarge the active region of the head, scanning time could be reduced by a factor of from 1.5 to 2, with the result that the usual scanning time, which is from five to twenty minutes, can be reduced by this factor. Because a certain number of stimuli need to interact with the crystal in order to obtain a useable image, the higher sensitivity that results from using the entire region of the head could be utilized, either for reducing scan time while using the same dose for the patient, or reducing the dose to the patient and maintaining the scan time.

Various combinations of scan time and dosage reduction would result if it were possible to utilize a larger active region of the head. Despite these distinct advantages in enlarging the active region of the head, this approach has not been utilized in the past because of distortions in the activity distribution of the radiation field caused by the non-uniformity in the sensitivity of the system.

In the prior art system, seam artifacts occur which cause a deterioration in the quality of the image. these artifacts are created whenever the fields of the forward scan and the backward scan do not exactly match along their common edge due to imperfect parallelity.

One advantage in the present invention is the elimination of the seam artifacts by creating an overlap region which is scanned twice, once in a forward direction, and once in a backward direction. In the prior art systems the width of the scanned area is fixed and may be significantly wider than the patient, with a significant part of the active area not being utilized. An additional advantage of the present invention is the doubling of the sensitivity in the overlap region because of that region being scanned twice, thus increasing the total sensitivity of the system by another factor of 1.5 to 2.

Therefore, it is an object of the present invention to provide a new and improved scanning gamma camera in which the non-uniform sensitivity of a scanning system can be compensated for in order to reduce scan time, and/or reduce dosage, and/or improve image quality.

DISCLOSURE OF INVENTION

In accordance with the present invention, a scanning gamma camera follows a pre-determined scanning regimen with respect to a radiation field which results in a non-uniformity of the scanning time interval distribution over the field; and a representation of the activity distribution of the field is recorded in such a way that the non-uniform scanning time interval distribution is compensated for. Such representation is modified by multiplying the representation at a given location by a correction factor proportional to the reciprocal of the scanning time interval distribution evaluated at such location.

The invention is applicable to a single pass system using a collimator that diverges in a direction transverse to the direction of scanning, or a multiple pass system using a parallel hole collimator. In the single pass system, the efficiency of the diverging collimator is modified by varying the distance between the subject being scanned and the camera head. In the multiple pass system, the number of passes and the distance between the passes are determined by the width of the subject being scanned, the selections being made in a manner that most efficiently utilizes the active region of the head.

The necessary correction factors may be calculated analytically or determined by a calibration process. In one calibration process, a uniform flood source as large as the entire radiation field is scanned by the gamma camera head following the predetermined scanning regimen for obtaining a calibration map of the flood source. By obtaning the ratio of the number of interactions of stimuli from the floor source per elemental area of the calibration map averaged over the width of the radiation field, to the actual number of interactions with a given elemental area of the calibration map, a sensitivity correction factor can be calculated for the given elemental area of the map.

After a nuclear imaging procedure has been completed, using the predetermined scanning regimen, a map of an unknown radiation field obtained by following the scanning regimen is corrected by applying the sensitivity factor obtained by the calibration process to the contents of the corresponding elemental areas of the map. The sensitivity scanning factor is essentially the reciprocal of the brightness of the map of the uniform radiation field with the result that the map of the unknown radiation field will be corrected for the non-uniform sensitivity of this system.

A more efficient method for obtaining the sensitivity correction factors, where the scanning regimen is constituted by parallel, transversely displaced linear, longitudinal traverses of a field, employs a uniform field whose transverse dimension is compatible with the scanning regimen but which has a longitudinal dimension equivalent to the dimension of an elemental area. This method is based on a recognition that, during longitudinal displacement of the head relative to uniform field, information produced by the active region of the head repeats itself for each elemental area scanned, except at the leading and trailing edges of the field. The effect of the edge regions can be simulated by summing the interactions of the head with the flood source with only the appropriate portion of the active region of the head, such interactions continuously increasing in a manner similar to the windowing method described above. When the full active region of the head is reached, sensitivity correction factors are obtained which are applicable to the entire middle section of the field. This particular method for obtaining the sensitivity correction factors is restricted to fields having a uniform width in the longitudinal direction, and thus requires a parallel relationship to exist between multiple passes.

The present invention permits maximized use of the active region of the crystal, and at the same time eliminates seam artifacts associated with conventional scanning while increasing the resolution of the recorded image in a region lying along the centerline of the scanned field. The active region of the crystal may thus be round or mostly round with an area larger than the active region of a conventional windowed gamma camera thereby providing a larger target for stimuli from the field and reducing scan time and/or dosage, and/or improving image quality.

The transverse displacement of the camera head relative to the field can be adjusted to match the width of the subject being scanned. Thus, the width of overlap during multiple parallel traverses of a field is variable. As a consequence, the efficiency of utilization of the active region of the head is maximized.

Artifacts lying along the center-line of the radiation field are introduced in prior art scanning gamma cameras because of minor deviations in the parallel nature of the paths followed by the head as it scans forwardly and rearwardly in making two passes over the field. Thus, instead of the reproduced fields just touching along their lateral sides at the center-line, the fields diverge slightly or even overlap.

The present invention eliminates artifacts introduced by the non-parallel nature of linear displacements of the head in its several passes by carrying out a calibration process in which a plurality of separate point sources in the overlap region are imaged by the scanning gamma camera in each of its two passes to permit dislocation correction factors to be computed. These dislocation correction factors can be used to relocate the two maps of the radiation field. Thus, the present invention provides a way to eliminate seam artifacts and at the same time produce a better image in the region of the overlap. The image at the overlap is improved because it is scanned twice and therefore has greater sensitivity than the remainder of the map of the image. It is this region of a map that is of most medical interest in the general situation because this contains the main bone structure of a patient.

BRIEF DESCRIPTION OF DRAWINGS

Embodiments of the invention are shown by way of example in the accompanying drawings wherein.

DESCRIPTION OF THE PREFERRED EMBODIMENT

Figure 1:
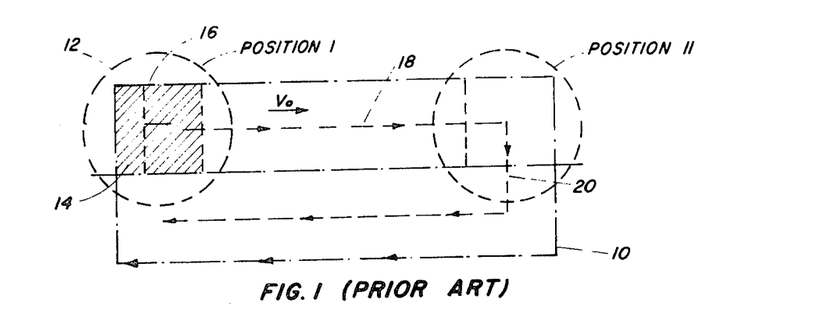
FIG. 1 is a schematic plan view of a radiation field that encompasses the whole body of a patient and that must be scanned by a gamma camera head showing the paths followed by the head during a two-pass mode of scanning operation.

Referring now to FIG. 1, reference numeral 10 designates the outline of a field to be scanned by a scanning gamma camera. As indicated above, when this field is to encompass the entire body of a patient, it is about 200×60 cm. One example of a conventional gamma camera operates in the manner shown in FIG. 1, wherein the circular portion 12 represents the outline of the active region of a scintillation crystal. Initially, the camera head is located to one side of the centerline of field 10 in position I where the electronics of the camera head are adjusted so as to define a window limited in size to the hatched area 14. Before the scan is started, window 14 is closed and the camera head is stationary at position I. When the scan starts, the head remains stationary as the window begins to open; and data acquisition commences as stimuli from the field interact with the head. The window enlarges continuously as the leading edge 16 of the window moves toward the right as seen in FIG. 1 at a uniform speed until maximum size is reached. When the window size reaches its maximum, or predetermined size, the camera head begins to move to the right at the same speed at which the window was enlarged.

The head traverses a path indicated by reference numeral 18 on one side of the centerline of field 10 from axial position I at one end of the field to axial position II at the other end of the field. Movement of the head stops at this point and window 14 is contracted electronically from its maximum size to zero at the same rate at which it was opened. Data acquisition by the camera then terminates.

Relative movement between the head and the field then occurs, usually by holding the head stationary and laterally displacing a scanning table that carries the field. The head thus moves relative to the field across the centerline through the displacement 20 until the head is on the opposite side of the centerline of the field. The process described above then repeats. That is to say, while the head remains stationary, window 14 is opened to its predetermined size (in this case, the leading edge of the window moves leftwardly as seen in FIG. 1). Then, the head moves from axial position II toward axial position I. On arrival, head movement terminates and the window is closed.

Because of the relationship between the shape and size of the window of the gamma camera and the speed at which the gamma camera traverses area 10, each elemental area of the total area 10 is "seen" or scanned by a portion of the effective area of the crystal, namely, the area defined by the window, for the same period of time. That is to say, the time interval during which each elemental area of the radiation field is scanned is the same. Stated otherwise, the above described scanning regimen is one which produces a uniform scanning time interval distribution. As a consequence of this conventional approach to a scanning gamma camera, the sensitivity of the system is uniform. In other words, any variation in the number of counts accumulated for each elemental area of the overall area 10 will arise due to variations in the radiation field within area 10, not taking into account the inherent non-uniformities in the response of the gamma camera itself.

Figure 2:
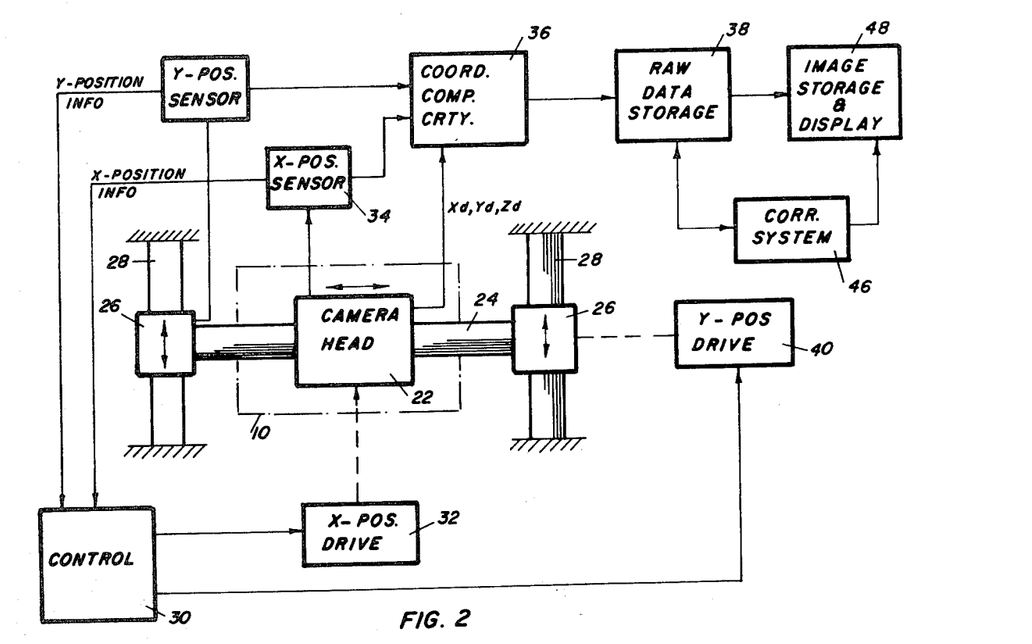
FIG. 2 is a schematic showing of a scanning gamma camera for providing a two-pass mode of operation, and showing a block diagram of the electronics by which the present invention is carried out.

According to the present invention, the shape and size of the active region of head, and the process for scanning a field establishes a scanning regimen such that the radiation field scanned by the head has a non-uniform scanning time interval distribution. One schematic arrangement according to the present invention for controlling the movement of the gamma camera and analyzing the data obtained therefrom is illustrated in FIG. 2 to which reference is now made. Gamma camera head 22 is mounted for linear movement on slide 24 in a conventional way so that the head moves longitudinally relative to field 10 from one end to the other. In addition, slide 24 is mounted on blocks 26 which are slideably mounted on rods 28 for the purpose of permitting head 22 to move laterally or transversely relative to area 10.

In operation, control 30 commands x-position drive 32 to move head 22 from one axial end of field 10 to the other at a predetermined speed. Information on the lengthwise position of the head is determined by x-position sensor 34 which returns this information to control 30 as well as to conventional coordinate computation circuitry 36. In this manner, control 30 is effective to accurately position the camera and control its speed. In addition, the coordinate position information is used by the coordinate computation circuitry 36 in order to convert the calculated coordinates of each stimulus interacting with the gamma camera from the coordinates of the crystal to the coordinates of field 10.

As with conventional gamma cameras, various correction factors can be applied to the output signals of the gamma camera head for the purpose of correcting distortions due to dislocations, due to deviations in total energy of the interactions of stimuli with the crystal, and due to the non-homogeneous stopping power of the crystal and collimator.

Detection of an interaction between a stimulus from field 10 and the crystal of the gamma camera is recorded in digital memory 38 at an address in the memory corresponding to the coordinates of the interaction based on the coordinate system of field 10. This process continues while the head traverses the field from one terminal position to the other. When the other terminal position of the head is reached, control 30 terminates further accumulation of data from the camera head and signals y-position drive 40 to move the head laterally from one side of the centerline of the field to the other side in preparation for the return of the head to the original axial end of the field. After the head has been moved transversely, control 30 is effective to command x-position drive 32 to return the head and at the same time to reactivate the computation circuitry 36 for the purpose of computing the coordinates of the various interactions that occur during the return of the head to its starting position. Upon completion of the scan, control 30 terminates further computation and the contents fo memory 38 constitute a digital map of the radiation field contained in area 10.

Figure 4:
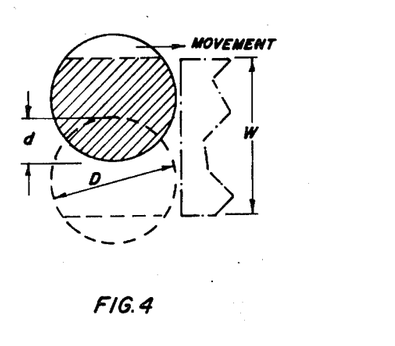
FIG. 4 is a schematic of a preferred form of active region of a crystal shown in its relationship to a field of width D.

The active region of the crystal, for the most part, may be circular as indicated in FIG. 4 wherein the periphery of the active region includes a chord. With this arrangement, a field of width W can be scanned in two passes providing an overlap of width d for a crystal having a circular active region of diameter D. The chord, which is formed electronically, is selected to match the width W and to provide the desired overlap width.

While a two-pass system has been described, it is clear that a larger field can be scanned by making more than two passes and obtaining overlaps of practically any width. In addition, a scanning regimen other than that shown in FIG. 2 can be employed. In FIG. 2, the scanning table is stationary, and the head is moveable longitudinally and transversely relative to the table. However, it is also possible to have the head stationary and the table move. Alternatively, the usual arrangement could be used, namely longitudinal movement of the head relative to a stationary table, and transverse displacement of the table relative to the stationary head.

Regardless of the scanning regimen followed, memory 38 will contain data acquired under the condition that establishes a non-uniform scanning time interval distribution. Any display of the data in memory 38 will thus be distorted; and it is the function of correction system 46 to modify the representation of the field as contained in memory 38 by multiplying such representation, at each location, by a correction factor proportional to the reciprocal of the scanning time interval distribution evaluated at such location.

Figure 5:
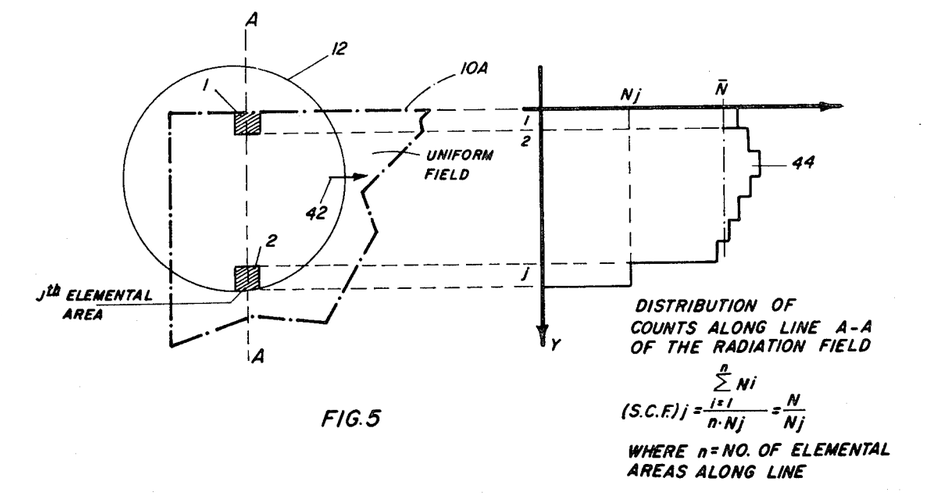
FIG. 5 is a schematic showing of a round scintillation crystal and its relationship to a rectangular radiation field showing the difference in sensitivity of various elemental areas of the radiation field; and, FIG. 6 is a schematic showing of a rectangular radiation field in which a two-pass mode of operation is employed wherein a central portion of a radiation field is mapped by the crystal when it moves in either direction, thereby creating an overlap.

Before describing the correction to be applied to the data contained in memory 38, reference is made to FIG. 5 for the purpose of illustrating the non-uniform sensitivity of the system which must be corrected for. FIG. 5 shows a crystal during a portion of its scan of uniform field 10A and, in particular, elemental areas 1 and 2 of uniform field 10, such areas lying along the transverse line A-A. As crystal 12 moves across the radiation field in the direction of arrow 42, stimuli from field 10A will interact with the crystal. Upon the passage of the crystal relative to line A-A, the interactions with the crystal due to stimuli originating at elemental areas 1 and 2 will be accumulated in the digital memory at an address associated with the coordinates of elemental areas 1 and 2. The accumulation of counts is illustrated in the right portion of FIG. 5, which is a plot of the number of counts versus distance along the y-axis of the field.

Because more of the crystal will pass over elemental area 1 of the field than over elemental area 2, the number of counts accumulated in the digital memory associated with elemental area 1 will exceed the number of counts accumulated in the memory associated with elemental area 2 as indicated in the graph. Thus, for a uniform field, the digital map resulting from a scan of the uniform field will be non-uniform in the y-direction in the manner indicated by the distribution designated by reference numeral 44. By carrying out a calibration process in the manner illustrated in FIG. 5 using a uniform field and following the same scanning regimen followed during a whole body scan, profiles can be established of the distribution of events measured along lines transverse to the direction of movement of the crystal as suggested by distribution 44. The distribution will be essentially the same throughout the entire longitudinal traverse of the crystal relative to the uniform field except for the edge effects at the beginning and end of the traverse.

As can be seen from FIG. 5, the distribution 44 is directly related to the time intervals during which elemental areas of the field are scanned, the evaluation of the distribution at a given location being the amplitude of the curve. Because the distribution is one dimensional, it can be evaluated analytically from the geometry of the active region of the crystal. However, it is often advantageous to carry out an actual calibration of a known reference field to obtain a two dimensional distribution which will take into account speed variations in the displacement of the head relative to the scanning table. Preferably, the known reference field is a uniform field. Analytical calculation of the correction factors, however, has the advantage of being move versatile in that it can cope with a scanning regimen with non-parallel passes.

With the overall scanning time interval distribution in hand, a sensitivity correction factor can be computed for each elemental area of the radiation field. This calculation is indicated in FIG. 5; and the sensitivity correction factor for a given elemental area is determined by the ratio of the average number of events per elemental area of the field to the actual number of events in the given elemental area. Thus, the non-uniform distribution of events shown in FIG. 5 can be converted into a uniform distribution of events by multiplying the contents of each elemental area of the map produced by the scanning of a uniform field by the correction factors computed in the manner indicated above. As indicated above the correction factor at a given location is proportional to the reciprocal of the scanning time interval distribution evaluated at such location.

In practice, a calibration process of the type described in connection with FIG. 5 is carried out before the gamma camera is used for performing a whole body scan. Thus, following the same scanning regimen as is followed in carrying out a whole body scan, a uniform radiation field is traversed by the gamma camera and the data accumulated in memory 38. Thereafter, the data is operated on in the manner indicated in FIG. 5 for computing the sensitivity factors for each elemental area of the radiation field scanned by the gamma camera head. A medical imaging process then can be carried out in which the radiation field is unknown. The data are accumulated in the digital memory 38 in the manner described above and correction system 46 (FIG. 2) applies the sensitivity factors obtained during calibration mode of operation to the data stored in memory 38. When these data are corrected, a new corrected map can be stored and later displayed on image storage and display 48 in a conventional manner.

Figure 3:
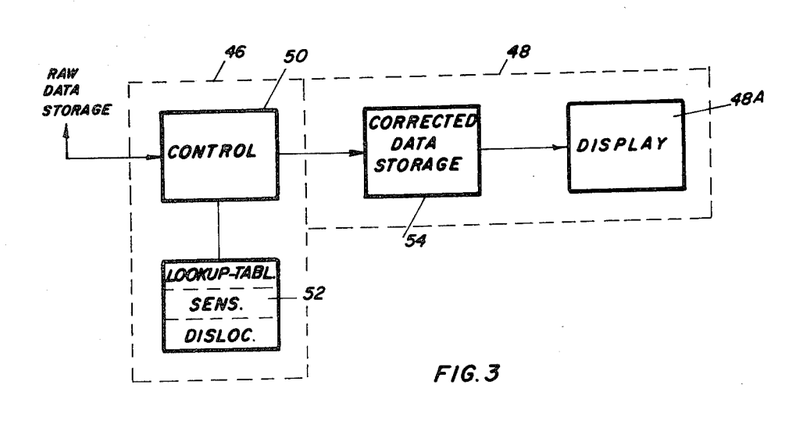
FIG. 3 is a block diagram of the correction system and image storage/display of FIG. 2.

Referring now to FIG. 3, the details of correction system 46 are shown. Such circuit, which constitues digital storage and correction means, includes control 50 which extracts the respective contents of the memory registers of digital memory 38. The contents of each register in memory 38 is multiplied by the correction factor for the coordinates of the map determined by the sensitivity correction factors stored in look-up table 52. After correction factor is multiplied by the contents of a register, the result is a number that is deposited in memory 54 at the same address as the register. When all of the corrected data has been stored, the corrected image can be displayed in a conventional manner at 48A.

Summarizing, the contents of memory 38 constitute a record of a representation of the activity distribution of field 10. After correction system 46 is activated, memory 54 will contain a representation of the activity distribution of the field corrected so as to compensate for the non-uniform scanning time interval distribution.

The system described above is digital, but the invention is also applicable to an analog or combined analog/digital system. That is to say, the recordation of data acquired by the head during the scanning regime can be analog storage means, such as, for example, a piece of photographic film. In such case, events can be displayed in real time on the screen of a CRT where the x,y coordinates of an event are obtained as the output of the computation circuitry of the gamma camera; and the intensity of the light spot on the screen representing an event is modulated in accordance with a correction factor that is obtained from a look-up table at an address determined by the x,y coordinates. A record is made by exposing film to the output of the CRT. In such case, the sensitivity correction factors are applied "on-the-fly" before the data are stored on the film.

Look-up table 52 may also contain dislocation correction factors of the type disclosed in U.S. Pat. No. 3,745,345. In such case, correction circuit 46 would correct the data for dislocations and store the result in memory 54.

Figure 6:
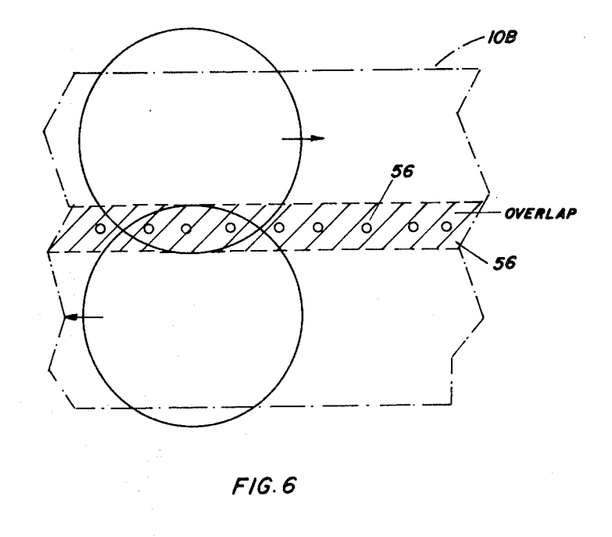

The present invention also provides a way to eliminate artifacts lying along the centerline of the image. Such artifacts in prior art systems are caused by deviations from the parallel relationship between the path followed when the head scans in one direction as compared to the path followed when the head scans in the opposite direction. The so-called seam artifacts are located in the overlap portion 58 of the image where the projection of the crystal on the radiation field when the crystal scans in one direction overlaps the projection of the crystal when it scans in the opposite direction.

Artifacts in the seam can be eliminated by following the calibration technique shown in FIG. 5 to which reference is now made. The calibration process involves a special radiation field 10B which is of the same size as fields 10 or 10A, and which is scanned using the normal regimen of the gamma camera. The field in this case, however, is provided with a series of point radiation souces 56 lying along the center line of the field and within overlap region 58. Instead of using point sources, a perforated plate can be used in combination with the previously referred to uniform field. In such case, reference numeral 56 would identify the apertures in the plate.

The computed coordinates of the point sources, when the crystal scans in one direction, can be compared with the computed location of these sources when the crystal scans in the opposite direction as indicated in FIG. 5. Thus, two separate maps of the overlap region can be produced, one from the scan of the head in one direction and one from the scan of the head in the opposite direction. The dislocation of the points in one scan relative to the point in the other can be computed by taking the first moment of the data associated with each point source.

Using the approach disclosed in U.S. Pat. No. 3,745,345 for making dislocation corrections, a set of correction factors can be computed for all of the data collected by the gamma camera when it scans in the return direction. These dislocation factors can be applied to the data obtained during a medical imaging operation when the head is scanning in its return direction. As a consequence, data obtained can be moved into exact correspondance with the data obtained during the scan of the head in a forward direction so that the date in the overlap region will be precisely located. The basic advantage in this approach lies in eliminating seam artifacts; but an important corollary advantage arises from the increased sensitivity within the overlap. This is particularly advantageous because the overlap will generally overlie the major bone structure of a patient and this, of course, is a very critical region of interest in a nuclear imaging process.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

We claim:
1. A scanning gamma camera comprising:
  (a) a head responsive to activity in an unknown radiation field for producing data;
  (b) scan control means for causing the head to follow a scan regimen wherein the radiation field scanning by the head has a non-uniform scanning time interval distribution; and
  (c) means responsive to said data for recording a representation of the activity distribution of the field so as to compensate for the non-uniform scanning time interval distribution.

2. A scanning gamma camera according to claim 1 wherein said representation is modified by correcting the representation at a given location according to a correction factor essentially proportional to the reciprocal of the scanning time interval distribution evaluated at such location.

3. A scanning gamma camera according to claim 2 wherein said correction factors are predetermined in accordance with the activity distribution of a known reference radiation field scanned by the head following said scanning regimen, the correction factor for a given location being obtained by taking the ratio of the known normalized activity at the given location to the normalized actual measured activity at such location.

4. A scanning gamma camera according to claim 2 wherein the correction factors are predetermined in accordance with the activity distribution of a uniform field scanned by the head, the uniform field having the same transverse dimension as the unknown field and a longitudinal dimension no greater than the width of an elemental area, the correction factor for a given location being obtained by taking the ratio of the average activity over the width of the field to the actual measured activity at such location.

5. A scanning gamma camera according to claim 2 wherein said correction factors are predetermined in accordance with the geometry of the active area of the head and its path during the scan regimen.

6. A scanning gamma camera according to claim 2 wherein the shape of the active area of the head is, for the most part, circular.

7. A scanning gamma camera according to claim 6 wherein the periphery of the active area of the head includes a chord.

8. A scanning gamma camera according to claim 2 wherein the means for recording a representation of the activity distribution of the radiation includes a digital memory, digital computing and storing means for determining sensitivity correction factors at corresponding addresses in the memory, image storage means for storing a representation of the corrected activity of the field, and control means correcting the contents fo a given address in the digital memory according to the sensitivity factor determined by the digital comuting and storage means.

9. A scanning gamma camera according to claim 8 wherein the digital computating and storage means includes a look-up table.

10. A scanning gamma camera according to claim 2 wherein the means for recording a representation of the activity distribution of the radiation field includes analog storage means, means for storing sensitivity correction factors respectively associated with locations within the scanned field, and electronic means for processing data produced by the head as a result of activity in a given location in the scanned field in accordance with the sensitivity correction factor associated with the given location before applying the processed data to the analog storage means.

11. A scanning gamma camera according to claim 2 wherein the scan control means establishes a scan regimen that includes a plurality of passes of the head over the radiation field, the passes constituting transversely displaced linear paths that are substantially parallel.

12. A scanning gamma camera according to claim 11 wherein the passes by the head are achieved by moving the head relative to the field.

13. A scanning gamma camera according to claim 11 wherein there are two passes.

14. A scanning gamma camera according to claim 13 wherein the projection of the active region of the head on the radiation field during one pass overlaps the projection of the active region of the head on the radiation field during the second pass.

15. A scanning gamma camera according to claim 14 including means for relocating the representations of the activity distribution of the field obtained during the two passes in accordance with dislocation correction factors.

16. A scanning gamma camera according to claim 15 wherein the dislocation correction factors are predetermined in accordance with displacement of the representation of the activity distribution of a known radiation field from the known representation.

17. A scanning gamma camera according to claim 16 wherein the known radiation field is in the form of a linear array of point sources lying along side overlap.

18. A scanning gamma camera according to claim 2 wherein the shape of the active region of the head is, for the most part, polygonal.

19. A scanning gamma camera according to claim 1 wherein the head scans the field at a substantially uniform speed.

20. A scanning gamma camera of the type having a head for receiving stimuli from an unknown radiation field larger than the sensitive region of the head and for producing data representative of interactions of stimuli with the head, a mechanical drive system for imparting relative movement between the head and the field according to a predetermined regimen, and means responsive to said data for recording a representation of the activity distribution of the field, the improvement comprising utilizing a scan regimen wherein the scanning time interval distribution over the radiation field is non-uniform, and compensating the representation of the activity distribution of the radiation field for the non-uniform scanning time interval distribution.

21. The improvement of claim 20 wherein said representation is modified by a sensitivity correction factor for a given picture element of the representation of the radiation field predetermined in accordance with the inverse of the normalized number of interactions recorded at the address of the picture element in the memory during a calibration process in which the predetermined radiation field is a field of known distribution.

22. The improvement of claim 20 including applying a dislocation correction factor that corrects the representation of the radiation field for distortion along the overlap of the radiation field by the sensitive region of the head during different portions of the scan regimen.

23. A gamma camera for scanning a radiation field of predetermined size comprising:
(a) a head having a photosensitive area smaller than said radiation field for producing output signals when a stimulus from the field interacts with the photosensitive area;
(b) a mechanical drive system coupled to the head for imparting relative movement between the head and the field according to a predetermined regimen;
(c) coordinate computation circuitry responsive to said output signals for calculating the X,Y field coordinates of interactions of stimuli with the head;
(d) a digital memory for storing a representation of the radiation field by recording the occurrence of an interaction at an address corresponding to the coordinates of the interaction when the total energy of the interaction lies within a given energy window to obtain a map of the locations of the interactions that occur during a scan regimen;
(e) means containing sensitivity correction factors associated with various addresses in the digital memory; and
(f) means for applying the sensitivity correction factors to the digital memory to correct for distortions in the radiation field due to the failure of each elemental area of the radiation field to be observed by an active portion of the photosensitive area for the same period of time during the scanning regimen.

24. A gamma camera according to claim 23 wherein the sensitivity correction factors are predetermined in accordance with the normalized number of interactions recorded at the addresses of the memory corresponding to interactions during a calibration process in which the predetermined radiation field is a uniform flood source.

25. A gamma camera according to claim 23 wherein the mechanical drive system is such that the head traverses the radiation field in two passes, the projected area of the photosensitive area on the radiation field during one pass overlapping the projected area during the second pass.

26. A gamma camera according to claim 25 wherein the means for containing sensitivity correction factors includes a lookup table that contains dislocation correction factors for relocating the map of the radiation field obtained during one pass with respect to the map of the radiation field obtained during the second pass.

27. A gamma camera according to claim 26 wherein the dislocation correction factors are predetermined in accordance with the displacement of the calculated coordinates from the known coordinates of a plurality of point sources lying in the radiation field in the region of the overlap of the projected areas resulting from the two passes.

28. A gamma camera according to claim 23 wherein the sensitivity correction factors are analytically calculated in accordance with the geometry of the active region of the head in relation to the scanning regimen and taking into account known gamma camera inhomogeneities and dislocations.

29. A method for correcting a representation of an unknown radiation field which is scanned by the head of a gamma camera according to a predetermined regimen comprising:
   (a) calibrating the system by obtaining a sensitivity correction factor for each elemental area of the field based on the active region of the head and the scanning regimen;
   (b) collecting data from an unknown field to obtain a representation of the field using the output of the gamma camera; and
   (c) recording a representation of the unknown radiation field after applying the sensitivity correction factor to the representation.

30. A method according to claim 29 wherein the sensitivity correction factors are obtained by:
   (a) scanning a known reference radiation field according to said predetermined regimen for obtaining a map representative of the reference radiation field; and
   (b) calculating the sensitivity correction factor for a given location in the last mentioned map by obtaining the ratio of the known normalized number of interactions recorded at the address of the map to the normalized actual number of interactions at such location.

31. A method according to claim 29 wherein the known reference field is a uniform flood source.

32. A method according to claim 29 wherein the scanning regimen includes a first longitudinal displacement of the head from one terminal position to another, relative transverse displacement between the head relative to the field when the head is in a second terminal position, and a second longitudinal displacement of the head from the seond to said one terminal position, the regimen being such the active region of the head sweeps out a common portion of the radiation field, the method comprising;
   (a) calibrating the system by obtaining a dislocation correction factor for the area lying in said common portion of the radiation field; and
   (b) recording a representation of the unknown field after applying the dislocation correction factors to the representation fo the unknown field.

* * * * *

UNITED STATES PATENT AND TRADEMARK OFFICE
CERTIFICATE OF CORRECTION

PATENT NO. : 4,432,059
DATED : February 14, 1984
INVENTOR(S) : Dan INBAR

It is certified that error appears in the above-identified patent and that said Letters Patent is hereby corrected as shown below:

In Column 2, line 59, delete "these" and substitute ---These---.

In Column 7, line 4, delete "fo" and substitute ---of---.

In Column 8, line 10 after "one", insert --- - ---.

In Column 8, line 35 after "above", insert ---,---.

In Column 8, line 58 delete "constitues" and substitute ---constitutes---.

In Column 8, line 65 after "after", insert ---the---.

In Column 9, line 42 delete "5" and substitute ---6---.

In Column 9, line 48 delete "souces" and substitute ---sources---.

In Column 9, line 51 after "such" insert ---a---.

In Column 10, line 5 delete "correspondance " and substitute ---correspondence---.

In Column 10, line 7 delete "date" and substitute ---data---.

In Column 11, line 4 delete "storing" and substitute ---storage---.

UNITED STATES PATENT AND TRADEMARK OFFICE
CERTIFICATE OF CORRECTION

PATENT NO. : 4,432,059

DATED : February 14, 1984

INVENTOR(S) : Dan INBAR

It is certified that error appears in the above-identified patent and that said Letters Patent is hereby corrected as shown below:

```
In Column 11, line 8 delete "fo" and substitute ---of---.
In Column 11, line 9 delete "computating" and substitute
    ---computing---.
In Column 11, line 18 delete "," and substitute ---;---.
In Column 11, line 20 delete "," and substitute ---;---.
In Column 11, line 53 delete "side" and substitute ---
    said---.
In Column 14, line 18 delete "seond" and substitute ---
    second---.
In Column 14, line 19 after "such" insert ---that---.
In Column 14, line 27 delete "fo" and substitute therefor
    ---of---.
```

Signed and Sealed this

Nineteenth Day of March 1985

[SEAL]

Attest:

DONALD J. QUIGG

*Attesting Officer* — *Acting Commissioner of Patents and Trademarks*

UNITED STATES PATENT AND TRADEMARK OFFICE
CERTIFICATE OF CORRECTION

PATENT NO. : 4,432,059

DATED : February 14, 1984

INVENTOR(S) : D. INBAR et al.

It is certified that error appears in the above-identified patent and that said Letters Patent is hereby corrected as shown below:

Column 11, line 10, change "comuting" to ---computing---.

Column 11, line 13, change "computating" to ---computing---.

Column 10, line 27, change "scanning" to ---scanned---.

Signed and Sealed this

Fourteenth Day of July, 1992

Attest:

DOUGLAS B. COMER

*Attesting Officer*  *Acting Commissioner of Patents and Trademarks*